United States Patent [19]

Ostermeyer et al.

[11] 4,433,084
[45] Feb. 21, 1984

[54] HIGH-FLOAT, RAPID-SETTING EMULSION

[75] Inventors: Larry F. Ostermeyer; Michael N. Guerin, both of West Lafayette, Ind.

[73] Assignee: K. E. McConnaughay, Inc., Lafayette, Ind.

[21] Appl. No.: 425,395

[22] Filed: Sep. 28, 1982

Related U.S. Application Data

[63] Continuation-in-part of Ser. No. 381,543, May 24, 1982, abandoned.

[51] Int. Cl.$^3$ .................... B01J 13/00; C08L 95/00
[52] U.S. Cl. ...................... 524/62; 106/277; 252/311.5; 524/59; 524/270; 524/274
[58] Field of Search .............. 106/277; 252/311.5; 524/59, 62, 270, 274

[56] References Cited

U.S. PATENT DOCUMENTS

| | | | |
|---|---|---|---|
| 2,789,917 | 4/1957 | Hardman et al. | 106/277 |
| 2,855,319 | 10/1958 | McConnaughay | 106/277 |
| 2,941,893 | 6/1960 | McConnaughay | 106/277 |
| 3,036,015 | 5/1962 | Woodward | 106/277 |
| 3,110,604 | 11/1963 | McConnaughay | 106/277 |
| 3,607,773 | 9/1971 | Pitchford et al. | 252/311.5 |
| 3,867,162 | 2/1975 | Elste | 106/277 |
| 3,892,668 | 7/1975 | Chiu | 260/97.5 |
| 3,979,323 | 9/1976 | Spahr et al. | 106/277 |
| 4,209,337 | 6/1980 | Wagner et al. | 106/277 |

FOREIGN PATENT DOCUMENTS

| | | | |
|---|---|---|---|
| 1440 | 4/1979 | European Pat. Off. | 524/62 |

Primary Examiner—Ronald W. Griffin
Attorney, Agent, or Firm—Barnes & Thornburg

[57] ABSTRACT

A high-float rapid-setting emulsion comprised of asphalt, tall oil, tall oil derivatives or mixtures thereof, copolymer selected from the group consisting of a styrene-butadiene-styrene block and styrene-isoprene-styrene block, petroleum distillate, water, and strong base. In addition, methods of manufacturing a high-float, rapid-setting emulsion including a first method comprising mixing asphalt with tall oil, tall oil derivatives or mixtures thereof, and combining and mixing said mixture with treated water comprising tall oil, tall oil derivatives or mixtures thereof, strong base, and water. A second method comprises mixing asphalt with reacted tall oil, tall oil derivatives or mixtures thereof, said reacted tall oil, tall oil derivatives or mixtures thereof comprising tall oil, tall oil derivatives or mixtures thereof, reacted with a strong base, and mixing and combining the asphalt-reacted tall oil, tall oil derivatives or mixtures thereof mixture with treated water comprising tall oil, tall oil derivatives or mixtures thereof, strong base, and water. A third method comprises mixing asphalt with treated water comprising tall oil, tall oil derivatives or mixtures thereof, strong base, and water. A fourth method comprises mixing asphalt, copolymer selected from the group consisting of styrene-butadiene-styrene block and styrene-isoprene-styrene block, petroleum distillate, and mixing and combining the asphalt, copolymer, petroleum distillate mixture with treated water comprising tall oil, tall oil derivatives, or mixtures thereof, strong base, and water.

A rapid-setting emulsion used primarily in surface treatments, such as chip seal coats, also possesses high-float properties normally found in medium-setting grades of emulsions. A method for preparation involves modifying the asphalt cement prior to emulsification, and then emulsifying with an emulsifier or agent normally used to manufacture rapid-setting emulsions such as ASTM D-977 RS-1 and RS-2 grades.

50 Claims, No Drawings

HIGH-FLOAT, RAPID-SETTING EMULSION

This is a continuation-in-part of our earlier filed co-pending U.S. patent application Ser. No. 381,543, filed May 24, 1982, which is a continuation of our earlier filed co-pending U.S. patent application Ser. No. 187,603, filed Sept. 15, 1980 both, now abandoned.

This invention relates generally to bituminous emulsions, and particularly to a seal coat grade material having both high-float properties and rapid-setting properties. Hereinafter, the inventive emulsions are frequently referred to as HFRS emulsions.

Certain types of high-float, medium-setting emulsions have been developed in the past. One such is described in U.S. Pat. No. 2,855,319. Attention is also directed to the following U.S. Pat. Nos. 2,789,917; 3,036,015; 3,979,323; 3,892,668; and 3,607,773, all cited in the above-identified patent application.

"Float" is a term which refers to the resistance of a material to flow under given conditions. Typically, for bituminous high-float emulsions, float tests are conducted upon samples of emulsion residues. Tests are conducted at selected temperatures, e.g., 140° F. on the residues. The "residues" of emulsion typically are considered to be what remains from an emulsion-containing emulsifier, water and asphalt cement, after the water is evaporated. The significance attached to the high-float property is that the residue from a high-float emulsion will not flow under the force of gravity at temperatures as high as 140° F. This property, non-flow, allows a greater margin of safety in the applied quantity of emulsion without having a fat or flushed pavement, thus greatly enhancing the possibility of obtaining a satisfactory pavement. A significant coorelation has also been established between high-float characteristics and other properties of bituminous emulsions which are extremely desirable.

One reason why the float test is used to determine the presence of other desirable characteristics is that the float test is relatively simple to perform.

An emulsion is defined as "rapid-setting" if the emulsion has a demulsibility or "break" of 60 or more (ASTM D-977) or 30 or more (Indiana State Highway Standard Specifications) as defined by the ASTM D-244 quick-break test. Rapid-setting emulsions are useful for seal coats, i.e., surface treatments of pavements. Such emulsions are also useful for penetration treatment of macadam, as sand seal coats and tack coats (to promote adhesion of overlayers), etc.

In this regard, reference is made to ASTM D-977 and the State of Indiana 902.04 Standard Specifications for emulsified asphalts.

According to one embodiment of the invention, a black liquor soap skimming (a by-product of pine wood digestion by the sulfate process to make pulp) is added to an asphalt cement prior to being emulsified. The amount of skimming added may vary from about 1% to about 5% based on the weight of the blend, depending on the solids content of the skimming and the nature of the asphalt being used. This blend is then emulsified in accordance with accepted techniques to provide a rapid-setting emulsion. See, for example, U.S. Pat. No. 2,789,917. With the skimming in the asphalt, the blend has properties that are different from those of the asphalt itself. Further, by being in the asphalt, the addition of the black liquor soap skimming has litle effect on the soap or water phase of the emulsion, which controls the rate of break. If the skimming were to be added to the soap or water phase, it would modify the resulting residue, but also would become part of the soap or water phase and could undesirably alter the emulsions's rate of break.

If the skimming has a high solids content, the skimming added typically will be toward the lower end of its approximately 1% to approximately 5% range. If the skimming has a lower percentage solids, such as where considerable water is present in the skimming, it will be added more toward the higher end of its range. The amount of skimming also varies depending upon the asphalt. Variations in the asphalt which cause variation in the amount of skimming required include variations in the amount of petroleum-derived acids (PDA) in the particular asphalt being used. The higher the PDA, the less skimming will be needed. Another variable in determining the amount of skimming necessary is the solubility of the asphalt in a standard heptane-xylene mixture. A good technique for determining the necessary amount of skimming is simply to experiment with different amounts on a laboratory scale with a particular lot of asphalt and float test each trial to establish the optimum skimming-asphalt ratio.

According to a second embodiment of the invention, a reacted tall oil, tall oil pitch, or tall oil derivatives, or combination thereof, is added to an asphalt cement prior to emulsification. The tall oil, pitch, derivatives, or combinations thereof are reacted with a strong base such as sodium hydroxide or potassium hydroxide in the range of about 3% to about 24% strong base, based on the weight of the tall oil, pitch, derivatives, or combinations. The range allows for the requirements of the different tall oil, pitch, derivatives, or combinations such as: tall oil pitch requires about 3% sodium hydroxide to form a suitable modifier; distilled tall oil requires about 16% sodium hydroxide or 24% potassium hydroxide to form a suitable modifier. This modifier is then added to the asphalt cement prior to emulsification in the range of about 0.4% to about 10% modifier, based on the weight of the blend, depending on the modifier and the nature of the asphalt being used. If the modifier were to be added to the soap or water phase of the emulsion, the rapid-setting characteristics would be lost. By making the addition to the asphalt phase, the modifier has little or no adverse effect on the rate of break of the emulsion.

The exact amount of strong base depends upon the amount of rosin acids and fatty acids in the tall oil, pitch, derivatives, or mixtures. Distilled tall oil, for example, has much higher concentrations of rosin acids and fatty acids than tall oil pitch. Thus, distilled tall oil will require somewhat more strong base for addition to the asphalt. The acid number of the tall oil, pitch, derivatives, and mixtures thereof is one factor which controls the amount of strong base needed.

The range of tall oil, pitch, derivatives, or combinations thereof, about 0.4% to about 10%, based on the weight of the asphalt-tall oil, pitch, derivatives or combinations blend, is chosen to take into account variations in the asphalt. For example, in an asphalt with a higher PDA, less tall oil, pitch, derivatives or combinations will ordinarily be required. As another example, the greater the amount of soluble rosinous maltine fractions in the asphalt, the less tall oil, pitch, derivatives or combinations will ordinarily be required. A suitable technique for determining the optimum ratio of asphalt to tall oil, pitch and derivatives is to experiment with different ratios on a laboratory scale and float test each trail to establish the optimum tall oil, pitch, derivatives or mixtures-asphalt ratio.

According to a third embodiment of the invention, a mixture of tall oil, tall oil pitch, and/or selected tall oil derivatives (illustratively, tall oil heads and tall oil rosins and fatty acids) is mixed with a water solution of a caustic composition, such as sodium hdyroxide or potassium hydroxide to form an emulsifier. Subsequently, this emulsifier is blended with the asphalt. The ratio in the blend will vary, dependent upon the asphalt used. For example, one asphalt may require a blend of 50 parts tall oil, 30 parts tall oil pitch, and 20 parts tall oil heads, while another asphalt from a different source may require a 45 parts tall oil, 25 parts pitch, and 30 parts heads blend to produce an asphalt emulsion that is both high-float and rapid-setting. This method can be effective if the asphalt is not too variable. However, if there is substantial variability in the asphalt, as may be the case if asphalts from several different sources are used, the methods wherein the asphalt is treated prior to emulsification is preferred.

This technique permits the user to adjust the amounts of various rosin acids and fatty acids in the blend through the use of various mixtures of various tall oil fractions. The lighter molecular weight fractions of tall oil (e.g., heads) typically have higher percentages of the lighter acids, such as fatty acids. The heavier constituents of tall oil, e.g., rosin acids, are typically found in higher concentrations in the heavier fractions, such as pitch or crude tall oil.

In this embodiment, both the ratios of the various tall oil constituents to each other and the ratio of the final tall oil constituent blend to the asphalt will be determined based upon variables in both the asphalt (e.g., PDA, and soluble rosinous maltine fractions to insoluble asphaltines in the asphalt) and the tall oil constituents (e.g., rosin acids to fatty acids ratios in the pitch, crude tall oil, heads, and whatever other "cuts" of the tall oil distillation process are used, and nature and physical properties—such as weights—of the various rosin acids and fatty acids in the various cuts used).

According to a fourth embodiment of the invention, a rapid-setting emulsion that exhibits high-float characteristics is made by modifying an asphalt prior to emulsification with a sufficient amount of a copolymer rubber such as a styrene—butadine—styrene block (SBS) copolymer or a styrene—isoprene—styrene block (SIS) copolymer. This may be achieved by adding from about 1% to about 5% of the copolymer, depending on the copolymer rubber chosen and whether the copolymer rubber links radially or straight line. This blend is then emulsified as a rapid-setting emulsion as described in connection with the first or second embodiments discussed above. This method of manufacturing a high-float rapid-setting emulsion is somewhat more expensive than the embodiments discussed above. However, these "plasticized" asphalt compositions can be used in circumstances where they will outperform the previously discussed compositions. For example, where there are very high-volume traffic areas, and particularly where the traffic is predominantly heavy vehicles, such as semi-tractor trailers and the like, at relatively high speeds, the plasticized asphalt compositions provide durable high-float, rapid-setting seal coats.

These finished emulsions exhibit high-float characteristics as well as other desirable characteristics indicated by high float. The emulsions are rapid-setting, making them seal coat- or tack coat-grade materials.

One of the desirable properties of these asphalt emulsions residues, related to the high float characteristics, is a lower oxidation rate, as defined by penetration and the percent loss in penetration after the thin film test, or $$\frac{PEN - TFOPEN}{PEN} \times 100\%.$$

Penetration, simply defined, is a measure of relative hardness. ASTM Standard Test method D-5 describes a typical penetration test. The test is conducted to determine how far a standard configuration needle penetrates into a sample of, for example, an asphalt emulsion residue.

To determine the relative hardness of a particular emulsion residue, the penetration of the emulsion residue is measured after the water has been evaporated from the emulsion, and before any substantial oxidation of the residue is permitted to take place. Typically, this is performed at 77° F., in accordance with ASTM D-5. Subsequently, a sample of the residue is prepared in accordance with ASTM D-1754 by oxidation in a thin film oven (TFO), and the thus-oxidized residue is measured for penetration, again at 77° F. Then a comparison is made between the TFO penetration and the original penetration. This comparison may take two forms, both of which are helpful in evaluating emulsion residues. In the first form, a straight ratio is generated between TFO penetration and original penetration. In the second form, the percentage loss in penetration through oxidation is calculated. This percentage loss in penetration calculation is made by subtracting the TFO penetration from the original penetration, dividing the difference by the original penetration, and multiplying by 100%. The lower the percentage of loss can be interpreted that the residue will retain its life longer than those with higher percentage of loss. Therefore, the high-float residues should have a longer life expectancy than the asphalt cement and residues not processing the high-float characteristics.

Another of these desirable properties related to the high-float characteristics is a significant increase in the kinematic and absolute viscosity. ASTM Standard Test Methods D-2170 and D-2171 describe these tests. The greater the viscosity, the greater the stiffness or strength as a binder at the elevated test temperatures. Also, with viscosities at two test temperatures (140° F. and 275° F.) and penetration at a third test temperature of 77° F., a good prediction of the materials temperature susceptibility can be obtained.

The following TABLE illustrates the test results for twenty-two EXAMPLES performed to determine the relative quality of the instant high-float rapid-setting emulsions and prior art emulsions.

There are twelve column headings in the table. They are as follows:
1. EX. NO.—EXAMPLE number;
2. AC SOURCE—The supplier or source of the control asphalt;
3. AC GRADE—The asphalt specification or grade of the source asphalt;
4. EMUL. TYPE—The emulsion type, such as RS (rapid-setting) or HFRS (high-float rapid-setting);
5. Q.B.—The quick break demulsibility, measured in accordance with ASTM D-977 and ASTM D-244, a measure of how rapidly the emulsion "breaks," or sets;
6. PEN@77° F.—The penetration of the asphalt cements and the emulsion residues at 77° F. (ASTM D-5);
7. FLOAT@140° F.—The float test in seconds on the asphalt cements and the emulsion residues at 140° F. (ASTM D-139);
8. VIS.@140° F.—The absolute viscosity in poise on the asphalt cements and the emulsion residues at 140° F. (ASTM D-2171);
9. VIS.@275° F.—The kinematic viscosity in centistokes on the asphalt cements and the emulsion residues at 275° F. (ASTM D-2170);
10. TFO PEN@77° F.—The penetration of thin film oven residues (ASTM D-1754 and D-5) of the asphalt cements and the emulsion residues—the penetration at 77° F.;
11. TFO PEN/PEN—The ratio of the thin film oven penetration and the original penetration;
12. % PEN LOSS—The original penetration minus the thin film penetration, divided by the original penetration, then times 100%.

The following EXAMPLES in TABLES I–III were formulated using the following asphalt cements: asphalt A-emulsion flux obtained from Ashland Oil Company, Inc., Refinery, Grand Island, Buffalo, New York; asphalt B-160 penetration asphalt cement obtained from Laketon Asphalt Refining Company, Inc., Laketon, Indiana; asphalt C-emulsion flux obtained from Exxon Refinery, Bayonne, New Jersey; asphalt D-emulsion flux obtained from Arco Petroleum Products Company Refinery, Marcus Hook, Pennsylvania; and asphalt E-150/200 penetration asphalt cement from Amoco Oil Company Refinery, Whiting, Indiana.

EXAMPLES I-1 and I-2 were high-float, rapid-setting (HFRS) emulsions made in accordance with the first embodiment of the present invention, and having properties as outlined in TABLE I.

EXAMPLES I-3—I-5 were HFRS emulsions, made in accordance with the second embodiment of the invention, and had the properties outlined in TABLE I.

EXAMPLES I-6—I-10 were HFRS emulsions, formulated according to the third embodiment of the invention. Five examples were performed to demonstrate that the mixture of tall oil, tall oil pitch, and/or selected tall oil derivatives can vary substantially, dependent upon the particular asphalt being emulsified, and the characteristics of that asphalt, which are not always readily identifiable. Variations in these characteristics account for a broad range for the various tall oil components. However, as discussed above, these ratios are considerably less variable if asphalt from a particular source can be obtained, and the physical and chemical characteristics of that asphalt are consistent. The properties of the emulsions of EXAMPLES I-6—I-10 are as outlined in TABLE I.

EXAMPLES I-12 and I-13 were HFRS emulsions formulated according to the fourth embodiment described above. The emulsions of EXAMPLES I-12 and I-13 exhibited the properties outlined in TABLE I.

EXAMPLES II-1—II-5 were controls formulated in accordance with prior art rapid-setting (RS) emulsion techniques, with properties as outlined in TABLE II.

The control emulsion of EXAMPLE II-1 was prepared as follows: 700 grams of asphalt A were mixed with 300 grams of treated water which contained 3.5 grams tall oil, derivatives or combinations thereof, 0.525 grams of sodium hydroxide, and about 294 grams of water. The weight of the finished emulsion was about 1,000 grams.

In EXAMPLE II-2, 700 grams of asphalt B were combined with 300 grams of treated water containing 3.5 grams of tall oil, derivatives or combinations thereof, 0.525 grams of sodium hydroxide and about 294 grams of water. The weight of the finished emulsion was about 1,000 grams.

In EXAMPLE II-3, 700 grams of asphalt C were combined with 300 grams of treated water which contained 2.8 grams of tall oil, derivatives or combinations thereof, 0.42 grams of sodium hydroxide, and about 294 grams of water. The weight of the finished emulsion was about 1,000 grams.

In EXAMPLE II-4, 700 grams of asphalt D were combined with 300 grams of treated water containing 3.5 grams of tall oil, derivatives or combinations thereof, 0.525 grams of sodium hydroxide, and about 294 grams of water. The weight of the finished emulsion was about 1,000 grams.

In EXAMPLE II-5, 700 grams of asphalt E were combined with 300 grams of treated water, including 3.5 grams of tall oil derivatives or combinations thereof, 0.525 grams of sodium hydroxide, and about 294 grams of water. The weight of the finished emulsion was 1,000 grams.

As will be appreciated, in each of these EXAMPLES, the weight of tall oil, derivatives or combinations thereof based on the weight of the total emulsion was about 0.35%. The tall oil was reacted with about 15%, by weight of the tall oil, derivatives or combinations, of sodium hydroxide.

In EXAMPLE I-1, 686 grams of asphalt A were combined with 14 grams of black liquor soap skimming to provide a total weight of 700 grams asphalt A/black liquor soap skimming. Thus, the weight of black liquor soap skimming based upon the total weight of asphalt A/black liquid soap skimming, was 2%. This was then combined with 300 grams treated water which contained 3.5 grams of tall oil, derivative or combinations thereof, 0.525 grams of sodium hydroxide, and about 294 grams of water. Thus, the total weight of the finished emulsion was 1,000 grams. The emulsion included 68.6% asphalt A, 1.4% black liquor soap skimming, 0.35% tall oil, derivatives or combinations thereof, 0.0525% sodium hydroxide, and 29.4% water.

In EXAMPLE I-2, 693 grams asphalt A were combined with 7 grams black liquor soap skimming. This mixture was then combined with 300 grams treated water containing 2.8 grams of tall oil, drivatives or combinations thereof, 0.42 grams sodium hydroxide, and about 296.8 grams of water. The amount of black liquor soap skimmings in the blend was thus 1% of the combined asphalt A/black liquor soap skimming combination, or about 0.7% by weight of the finished emulsion. The asphalt A comprised about 69.3% of the weight of the finished emulsion, the tall oil, derivatives or combinations in the treated water comprised about 0.28% of the finished emulsion, the sodium hydroxide comprised about 0.042% of the finished emulsion, and the water comprised about 29.68% of the finished emulsion.

In both of EXAMPLES I-1 and I-2, the black liquor soap skimming had a solids content of approximately 65%. Had the solids content of the black liquor soap skimming been lower (normally it is 50% or less), more of the black liquor soap skimming would have been required, and thus the black liquor soap skimming would have formed a somewhat larger percentage of the total weight of the finished emulsion.

In EXAMPLE I-3, a HFRS emulsion formulated in accordance with the second embodiment, 697.2 grams asphalt B were combined with 2.8 grams of tall oil, derivatives or combinations thereof which had already been reacted with 12%, by weight of the tall oil, derivatives or combinations therof, of sodium hydroxide. Thus, approximately 0.336 grams of sodium hydroxide was reacted with approximately 2.464 grams tall oil, derivatives or combinations thereof. This mixture was then combined with 300 grams treated water containing 3.5 grams tall oil, derivatives or combinations thereof, 0.525 grams sodium hydroxide, and about 294 grams water. The weight of the finished emulsion was thus about 1,000 grams, with asphalt B comprising about 69.7% of the weight of the finished emulsion, water comprising about 29.4% of the weight of the finished emulsion, sodium hydroxide comprising about 0.861% of the weight of the finished emulsion and tall oil, derivatives or combinations thereof comprising about 0.5964% of the weight of the finished emulsion.

In EXAMPLE I-4, 693 grams of asphalt B was first combined with 7.0 grams tall oil, derivatives or combinations thereof, which had been reacted with about 10% by weight (0.7 grams) sodium hydroxide. This mixture was then combined with 300 grams of treated water containing 2.1 grams of tall oil, derivatives or combinations thereof, 0.315 grams of sodium hydroxide, and about 297.6 grams water. The weight of the finished emulsion was approximately 1,000 grams. Asphalt B comprised about 69.3% of the weight of the finished emulsion. The water comprised about 29.76% of the weight of the finished emulsion. The tall oil, derivatives or combinations thereof comprised about 0.91% of the weight of the finished emulsion. The sodium hydroxide comprised about 0.1015% of the weight of the finished emulsion.

In Example I-5, 665 grams of asphalt C were combined with 35 grams of tall oil derivatives or combinations thereof which had already been reacted with 3%, by weight of the tall oil, derivatives or combinations thereof, of sodium hydroxide. Thus approximately 1.05 grams of sodium hydroxide were reacted with the approximately 34 grams tall oil, derivatives or combinations thereof. This mixture was then combined with 300 grams of treated water containing 1.75 grams of tall oil, derivatives or combinations thereof, about 0.263 grams of sodium hydroxide, and about 298 grams of water. The weight of the finished emulsion was approximately 1,000 grams. Of that, 66.5% was asphalt C, 29.8% was water, 3.575% was tall oil, derivatives or combinations thereof, and 0.1313% by weight was sodium hydroxide.

In the embodiments of EXAMPLES I-3 and I-4, the tall oil and tall oil derivatives blends had higher acid numbers and therefore required less of the modifier. In EXAMPLE I-5, the tall oil, derivatives or combinations thereof had a lower acid number and more modifier was required.

EXAMPLES I-6—I-10 and III-1—III-5 were all prepared using the third embodiment of the invention, with the same quantity of asphalt (700 grams) and the same quantity of treated water (300 grams). However, in the treated water, different mixtures of tall oil, derivatives or combinations thereof were used. Specifically, in EXAMPLES I-6, III-5, and I-8, the 300 grams treated water contained 2.1 grams tall oil heads (25 parts), 2.1 grams tall oil pitch (25 parts), and 4.2 grams crude tall oil (50 parts), as well as 1.1 grams sodium hydroxide and 290.5 grams water. Of these, EXAMPLES I-6 and I-8 formed acceptable HFRS emulsions, with the emulsion of EXAMPLE III-5 being less than acceptable as a HFRS emulsion.

EXAMPLES I-7 and I-10 both were formulated utilizing 2.4 grams tall oil heads (29.1 parts), 2.5 grams tall oil pitch (29.7 parts), and 3.5 grams crude tall oil (41.2 parts), as well as 1.2 grams sodium hydroxide and 290.4 grams water. EXAMPLES I-7 formed an acceptable HFRS emulsion, even though it employed the same asphalt as EXAMPLE III-5 which did not form an acceptable HFRS emulsion. EXAMPLE I-10 formed a borderline HFRS emulsion, although it used the same asphalt as EXAMPLE I-8 which formed a much more acceptable HFRS emulsion.

The emulsion of EXAMPLE III-1 was formulated using 4.2 grams tall oil heads (50 parts) and 4.2 grams crude tall oil (50 parts), as well as 1.2 grams sodium hydroxide and 290.4 grams water. The asphalt emulsion of EXAMPLE III-1 was somewhat less than acceptable as an HFRS emulsion, although it employed the same asphalt as EXAMPLE I-7 which did provide an acceptable HFRS emulsion.

EXAMPLE III-2 employed 4.9 grams (100 parts) distilled tall oil, as well as 0.8 grams sodium hydroxide and 294.3 grams water. EXAMPLE III-2 provided a less than suitable HFRS emulsion. However, it used the same asphalt as did EXAMPLE I-7 which provided an acceptable HFRS emulsion.

EXAMPLE III-3 included 7 grams tall oil pitch (50 parts) and 7 grams tall oil (50 parts) in addition to 2 grams sodium hydroxide and 284 grams water. Although it employed asphalt C, which had formed a suitable HFRS emulsion in EXAMPLE I-7, the emulsion of EXAMPLE III-3 was a less than satisfactory HFRS emulsion.

EXAMPLE III-4 employed 4.2 grams tall oil pitch (50 parts), 4.2 grams tall oil (50 parts), 1.2 grams sodium hydroxide, and 290.4 grams water. Again, although asphalt C, which had formed a suitable HFRS emulsion in EXAMPLE I-7, was used, the emulsion of EXAMPLE III-4 was not a suitable HFRS emulsion.

EXAMPLE I-9 was formulated to include 3.6 grams tall oil heads (42.7 parts), 2.3 grams tall oil pitch (27.4 parts), 2.5 grams crude tall oil (29.9 parts), as well as 1.3 grams sodium hydroxide and 290.3 grams water. Although this formulation used asphalt D, which had been used in the preparation of a suitable HFRS emulsion in EXAMPLE I-8, the EXAMPLE I-9 emulsion was less than satisfactory as a HFRS emulsion.

The specific percentages of the various constituents in EXAMPLES I-6—I-10 and III-1—III-5.

EXAMPLE I-6 70% by weight, asphalt A; 29.05% water: 0.21% by weight tall oil heads; 0.21% by weight tall oil pitch; 0.42% by weight crude tall oil; and 0.11% by weight sodium hydroxide.

EXAMPLE I-7, 70% by weight; asphalt C; 29.04% water; 0.24% tall oil heads; 0.25% tall oil pitch; 0.35% crude tall oil; and 0.12% sodium hydroxide.

EXAMPLE III-1 was formulated using 70% asphalt C; 29.04% water; 0.42% tall oil heads; 0.42% crude tall oil; and 0.12% sodium hydroxide.

The EXAMPLE III-2 formulation included 70% asphalt C; 29.43% water; 0.49% distilled tall oil; and 0.08% sodium hydroxide.

EXAMPLE III-3 included 70% asphalt C; 28.4% water; 0.7% tall oil pitch; 0.7% tall oil; and 0.2% sodium hydroxide.

EXAMPLE III-4 employed 70% asphalt C; 29.04% water; 0.42% tall oil pitch; 0.42% tall oil; and 0.12% sodium hydroxide.

EXAMPLE III-5 was formulated using 70% asphalt C; 29.05% water; 0.21% tall oil heads; 0.21% tall oil pitch; 0.42% crude tall oil; and 0.11% sodium hydroxide.

Example I-8 formulation included 70% asphalt D; 29.05% water; 0.21% tall oil heads; 0.21% tall oil pitch; 0.42% crude tall oil; and 0.11% sodium hydroxide.

The EXAMPLE I-9 formulation was blended using 70% asphalt D; 29.03% water; 0.36% tall oil heads; 0.23% tall oil pitch; 0.25% crude tall oil; and 1.3% sodium hydroxide.

EXAMPLE I-10 was formulated employing 70% asphalt D; 29.04% water; 0.24% tall oil heads; 0.25% tall oil pitch; 0.35% crude tall oil; and 0.12% sodium hydroxide.

EXAMPLE I-11 was formulated employing 70% asphalt C; 28.9% water; 0.49% tall oil pitch; 0.49% tall oil; and 0.14% sodium hydroxide.

EXAMPLES I-12 and I-13 were formulated using the fourth embodiment of the present invention. Specifically, styrene-isoprene-styrene block copolymer was added to an asphalt prior to emulsification. In the embodiment of EXAMPLE I-12, the SIS copolymer was added to a percentage by weight of an asphalt/fuel oil/copolymer blend of about 1%. In EXAMPLE I-13, the SIS copolymer was added to a percentage by weight of about 3% of an asphalt/fuel oil/copolymer blend.

Specifically, in EXAMPLE I-12, 665 grams of asphalt E was blended with 7 grams SIS copolymer and 28 grams No. 2 fuel oil. This blend was then emulsified with treated water including 3.5 grams tall oil, derivatives or combinations thereof; 0.525 grams sodium hydroxide and about 294 grams of water for a finished emulsion having a weight of 1,000 grams. Thus, the relative weights of the constituents in the finished emulsion included 66.5% asphalt E; 0.7% by weight SIS copolymer; 2.8% by weight No. 2 fuel oil; 29.4% by weight water; 0.35% by weight tall oil, derivatives or combinations thereof; and 0.0525% by weight sodium hydroxide. This blend formed a suitable HFRS emulsion. However, SIS copolymer is a radial-linking copolymer. A greater percentage by weight of the copolymer may be necessary in a particular blend if a linear linking copolymer (such as SBS) is used.

In EXAMPLE I-13, a blend of 651 grams asphalt E, 21 grams SIS copolymer, and 28 grams of No. 2 fuel oil was prepared. In this blend, the SIS copolymer formed about 3% by weight of the asphalt/No. 2 fuel oil/copolymer blend. This was then combined with treated water including 3.5 grams tall oil, derivatives or combinations thereof, 0.525 grams sodium hydroxide, and about 294 grams of water. Thus, the relative percentages by weight of the various constituents in this emulsion were 65.1% asphalt E; 2.1% SIS copolymer; 2.8% No. 2 fuel oil; 29.4% water; 0.35% tall oil, derivatives or combinations thereof; and 0.0525% sodium hydroxide. Again, this emulsion was a suitable HFRS emulsion.

Finally, it should be noted that the precise chemical identity of the tall oil, derivatives or combinations mix is dependent in large part upon the source of the mix. Tall oil generally is a by-product of the process of manufacturing kraft paper. In the process, a particular wood, illustratively pine, is digested with sodium hydroxide and sodium sulfide in water solution. When the waste liquid from digestion is concentrated by evaporation, certain sodium soaps of rosin acids and fatty acids coagulate into a superficial layer which is skimmed from the liquid and acidified with sulfuric acid to produce crude tall oil. As may be appreciated, different tall oils may require different amounts of the caustic compound to form the water soluble emulsifier. The amount of the caustic compound required is attributable to the different saponification numbers of the various compounds of crude tall oil. The identities of these components and the determination of the relative concentrations and saponification numbers depend, in part, on the type of wood digested and the particular process for manufacturing the crude tall oil. It may be appreciated, for example, that the crude tall oil itself may contain a small percentage of sodium hydroxide already in it, owing to the method of manufacture of crude tall oil.

It further should be appreciated that, while sodium hydroxide was the caustic compound used in the examples because of its relatively low cost, potassium hydroxide could also be used. The amount of potassium hydroxide necessary to obtain a water soluble emulsifier may vary from the typically 10% to 15%, by weight, of caustic compound to tall oil illustrated in the examples. However, such variations can be readily determined without undue experimentation.

As used in this specification and in the claims appended hereto, the term "emulsifier" shall have the same meaning as the term "soap concentrate" as that term is used in the field. It is the mixture which reacts in the reactor tank or kettle. As used in this specification and in the claims appended hereto, the term "cut-back emulsifier" shall have the same meaning as the terms "run water" and "soap water" as those terms are used in the field.

TABLE I

HFRS EMULSIONS

| EX NO. | AC SOURCE | AC GRADE | EMUL TYPE | DEMUL QB | PEN @77° F. | FLOAT @140° F. | VIS @140° F. | VIS @275° F. | TFO PEN @77° F. | TFO PEN PEN | % PEN LOSS |
|---|---|---|---|---|---|---|---|---|---|---|---|
| I-1 | ASHLAND | EMUL.FLUX | HFRS | 63.1 | 93 | 1200+ | 3303 | 17,562 | 76 | .817 | 18.3 |
| I-2 | ASHLAND | EMUL.FLUX* | HFRS | 82.1 | 71 | 1200+ | | | | | |
| I-3 | LAKETON | 160 PEN | HFRS | 66.9 | 135 | 1200+ | | | | | |
| I-4 | LAKETON | 160 PEN | HFRS | 90.4 | 130 | 1200+ | 4120 | MATERIAL WOULD NOT FLOW UNDER TEST CONDITIONS | | | |
| I-5 | EXXON | EMUL.FLUX | HFRS | 77.9 | 160 | 1200+ | | | | | |
| I-6 | ASHLAND | EMUL.FLUX | HFRS | 97.5 | 127 | 1200+ | 1033 | 1079 | 108 | .850 | 15.0 |
| I-7 | EXXON | EMUL.FLUX | HFRS | 98.5 | 131 | 1200+ | 1514 | | | | |
| I-8 | ARCO | EMUL.FLUX | HFRS | 95.5 | 15.7 | 1200+ | | | | | |
| I-9 | ARCO | EMUL.FLUX | HFRS | 31.0 | 150 | 1200+ | BORDERLINE DEMULSIBILITY | | | | |

TABLE I-continued

HFRS EMULSIONS

| EX NO. | AC SOURCE | AC GRADE | EMUL TYPE | DEMUL QB | PEN @77° F. | FLOAT @140° F. | VIS @140° F. | VIS @275° F. | TFO PEN @77° F. | TFO PEN PEN | % PEN LOSS |
|---|---|---|---|---|---|---|---|---|---|---|---|
| I-10 | ARCO | EMUL.FLUX | HFRS | 32.8 | 155 | 1200+ | | | BORDERLINE DEMULSIBILITY | | |
| I-11 | EXXON | EMUL.FLUX | HFRS | 81.4 | 122 | 1200+ | | | | | |
| I-12 | AMOCO | 150/200 PEN | HFRS | 86.4 | 105 | 1200+ | | | | | |
| I-13 | AMOCO | 150/200 PEN | HFRS | 98.4 | 140 | 1200+ | | | | | |

TABLE II

PRIOR ART RS EMULSIONS WITH ASPHALTS OF EXAMPLES I-1 – I-13

| EX NO. | AC SOURCE | AC GRADE | EMUL TYPE | DEMUL QB | PEN @77° F. | FLOAT @140° F. | VIS @140° F. | VIS @275° F. | TFO PEN @77° F. | TFO PEN PEN | % PEN LOSS |
|---|---|---|---|---|---|---|---|---|---|---|---|
| II-1 | ASHLAND | EMUL.FLUX | RS | 94.6 | 114 | 660 | 915 | 498 | 86 | .754 | 24.6 |
| II-2 | LAKETON | 160 PEN | RS | 84.7 | 103 | 682 | | | | | |
| II-3 | EXXON | EMUL.FLUX | RS | 72.9 | 127 | 256 | | | | | |
| II-4 | ARCO | EMUL.FLUX | RS | 92.6 | 147 | 500 | | | | | |
| II-5 | AMOCO | 150/200 PEN | RS | 99.3 | 137 | 379 | | | | | |

TABLE III

EXAMPLES OF EMBODIMENT 3 WHICH DEMONSTRATE THE ASPHALT SENSITIVITY OF THIS EMBODIMENT

| EX NO. | AC SOURCE | AC GRADE | EMUL TYPE | DEMUL QB | PEN @77° F. | FLOAT @140° F. | VIS @140° F. | VIS @275° F. | TFO PEN @77° F. | TFO PEN PEN | % PEN LOSS |
|---|---|---|---|---|---|---|---|---|---|---|---|
| III-1 | EXXON | EMUL.FLUX | HFRS | 22.1 | 128 | 1074 | DID NOT PASS FLOAT OR DEMULSIBILITY | | | | |
| III-2 | EXXON | EMUL.FLUX | HFRS | 34.6 | 125 | 412 | DID NOT PASS FLOAT OR DEMULSIBILITY | | | | |
| III-3 | EXXON | EMUL.FLUX | HFRS | 23.3 | 145 | 1200+ | DID NOT PASS DEMULSIBILITY | | | | |
| III-4 | EXXON | EMUL.FLUX | HFRS | 93.4 | 119 | 766 | DID NOT PASS FLOAT | | | | |
| III-5 | EXXON | EMUL.FLUX | HFRS | 48.6 | 129 | 744 | DID NOT PASS FLOAT OR DEMULSIBILITY | | | | |

What is claimed is:

1. A method of manufacturing a high-float, rapid-setting emulsion which comprises first mixing, by weight of the finished emulsion, about 60% to about 80% asphalt with about 0.05% to about 4% tall oil, tall oil derivatives or mixtures thereof, and then combining and mixing said mixture with treated water comprising, by weight of the finished emulsion, 0% to about 4% tall oil, tall oil derivatives or mixtures thereof, from 0% to about 1% strong base and about 25% to about 35% water.

2. The method of manufacturing the emulsion of claim 1 wherein the ratio by weight of asphalt comprises about 65% to about 70% of the emulsion.

3. The method of manufacturing the emulsion of claim 1 wherein the ratio by weight of tall oil, tall oil derivatives or mixtures thereof for combination in the first step with the asphalt comprises about 0.05% to about 3.5% of the emulsion.

4. The method of manufacturing the emulsion of claim 1 wherein the ratio by weight of tall oil, tall oil derivatives or mixtures thereof for mixing to form the treated water comprises from 0 to about 0.5% of the emulsion.

5. The method of manufacturing the emulsion of claim 1 wherein the ratio by weight of water comprises from about 28% to about 32% of the emulsion.

6. The method of manufacturing the emulsion of claim 1 wherein the ratio by weight of strong base comprises from 0 to about 0.2% of the high-float, rapid-set emulsion.

7. The method of manufacturing the emulsion of claim 6 wherein the strong base is an inorganic base.

8. The method of manufacturing the emulsion of claim 7 wherein the inorganic base is sodium hydroxide or potassium hydroxide.

9. A method of manufacturing a high-float, rapid-setting emulsion which comprises first mixing about 60% to about 80% asphalt with about 0.1% to about 3.2% reacted tall oil, tall oil derivatives, or mixtures thereof, said reacted tall oil, tall oil derivatives or mixtures thereof comprising tall oil, tall oil derivatives or mixtures thereof reacted with 10%, by weight of the tall oil, tall oil derivatives or mixtures thereof in the reacted tall oil, tall oil derivatives or mixtures thereof, of a strong base, and then mixing and combining the asphalt-reacted tall oil, tall oil derivatives, or mixtures thereof mixture with treated water comprising about 0.1% to about 1% tall oil, tall oil derivatives or mixtures thereof, from 0 to about 1% strong base, and about 25% to about 35% water.

10. The method of manufacturing the emulsion of claim 9 wherein the ratio by weight of asphalt comprises about 65% to about 70% of the emulsion.

11. The method of manufacturing the emulsion of claim 9 wherein the ratio by weight of water comprises from about 28% to about 32% of the emulsion.

12. The method of manufacturing the emulsion of claim 9 wherein the strong base is an inorganic base.

13. The method of manufacturing the emulsion of claim 12 wherein the inorganic base is sodium hydroxide or potassium hydroxide.

14. A method of manufacturing a high-float, rapid-setting emulsion which comprises first mixing, by weight of the finished emulsion, about 60% to about 80% asphalt with about 0.2% to about 3% copolymer, about 1% to about 4% petroleum distillate, and then mixing and combining the asphalt, copolymer, petroleum distillate mixture with treated water comprising, by weight of the finished emulsion, about 0.1% to about 4% tall oil, tall oil derivatives or mixtures thereof, about 0.01% to about 1% strong base, and about 25% to about 35% water.

15. The method of manufacturing the emulsion of claim 14 wherein the ratio by weight of asphalt comprises about 62% to about 68% of the emulsion.

16. The method of manufacturing the emulsion of claim 14 wherein the ratio by weight of the water comprises about 28% to about 32% of the emulsion.

17. The method of manufacturing the emulsion of claim 14 wherein the copolymer is selected from the group consisting of styrene-butadiene-styrene block and styrene-isoprene-styrene block.

18. The method of manufacturing the emulsion of claim 14 wherein the strong base is an inorganic base.

19. The method of manufacturing the emulsion of claim 18 wherein the inorganic base is sodium hydroxide or potassium hydroxide.

20. The method of manufacturing the emulsion of claim 14 wherein the petroleum distillate comprises Number 2 fuel oil and the ratio by weight of petroleum distillate comprises about 2.5% to about 3.1% of the emulsion.

21. A high-float, rapid-setting emulsion comprising the reaction product of the mixture of claim 1.

22. A high-float, rapid-setting emulsion comprising the reaction product of the mixture of claim 2.

23. A high-float, rapid-setting emulsion comprising the reaction product of the mixture of claim 3.

24. A high-float, rapid-setting emulsion comprising the reaction product of the mixture of claim 4.

25. A high-float, rapid-setting emulsion comprising the reaction product of the mixture of claim 5.

26. A high-float, rapid-setting emulsion comprising the reaction product of the mixture of claim 6.

27. A high-float, rapid-setting emulsion comprising the reaction product of the mixture of claim 9.

28. A high-float, rapid-setting emulsion comprising the reaction product of the mixture of claim 10.

29. A high-float, rapid-setting emulsion comprising the reaction product of the mixture of claim 11.

30. A high-float, rapid-setting emulsion comprising the reaction product of the mixture of claim 14.

31. A high-float, rapid-setting emulsion comprising the reaction product of the mixture of claim 15.

32. A high-float, rapid-setting emulsion comprising the reaction product of the mixture of claim 16.

33. A high-float, rapid-setting emulsion comprising the reaction product of the mixture of claim 17.

34. A high-float, rapid-setting emulsion comprising the reaction product of the mixture of claim 20.

35. A high-float, rapid-setting emulsion comprising, by weight, about 60% to about 80% asphalt, about 0.1% to about 4% tall oil, tall oil derivatives or mixtures thereof, about 0.1% to about 2.1% copolymer selected from the group consisting of styrene-butadiene-styrene block and styrene-isoprene-styrene block, about 25% to about 35% water, 0% to about 4% petroleum distillate, and about 0.1% to about 1% strong base.

36. The emulsion of claim 35 wherein the ratio, by weight, of asphalt comprises about 65% to about 70% of the emulsion.

37. The emulsion of claim 36 wherein the ratio, by weight, of tall oil, tall oil derivatives or mixtures thereof comprises about 0.3% to about 4% of the emulsion.

38. The emulsion of claim 37 wherein the petroleum distillate comprises No. 2 fuel oil and the ratio by weight of the petroleum distillate further comprises from 0% to about 2.8% of the emulsion.

39. The emulsion of claim 38 wherein the ratio by weight of strong base comprises about 0.04% to about 0.6% of the emulsion.

40. The emulsion of claim 39 wherein the strong base is an inorganic base.

41. The emulsion of claim 40 wherein the inorganic base is sodium hydroxide or potassium hydroxide.

42. A high-float, rapid-setting emulsion comprising, by weight, about 60% to about 80% asphalt, about 0.1% to about 4% tall oil, tall oil derivatives or mixtures thereof, 0% to about 3% copolymer, about 25% to about 35% water, about 0.1% to about 2.8% petroleum distillate, and about 0.01% to about 1% strong base.

43. The emulsion of claim 42 wherein the petroleum distillate comprises No. 2 fuel oil.

44. The emulsion of claim 43 wherein the ratio, by weight, of asphalt comprises about 65% to about 70% of the emulsion.

45. The emulsion of claim 44 wherein the ratio, by weight, of tall oil, tall oil derivatives or mixtures thereof comprises about 0.3% to about 4% of the emulsion.

46. The emulsion of claim 45 wherein the ratio, by weight, of copolymer comprises from 0% to about 2.1% of the emulsion.

47. The emulsion of claim 46 wherein the copolymer is selected from a group consisting of styrene-butadiene-styrene block and styrene-isoprene-styrene block.

48. The emulsion of claim 47 wherein the ratio, by weight, of strong base comprises about 0.04% to about 0.6% of the emulsion.

49. The emulsion of claim 48 wherein the strong base is an inorganic base.

50. The emulsion of claim 49 wherein the inorganic base is sodium hydroxide or potassium hydroxide.

* * * * *

UNITED STATES PATENT AND TRADEMARK OFFICE
CERTIFICATE OF CORRECTION

PATENT NO. : 4,433,084

DATED : February 21, 1984

INVENTOR(S) : Larry F. Ostermeyer and Michael N. Guerin

It is certified that error appears in the above-identified patent and that said Letters Patent is hereby corrected as shown below:

In the ABSTRACT, delete lines 30-37.

In column 1, before line 4, insert the following paragraph:

--A rapid-setting emulsion used primarily in surface treatments, such as chip seal coats, also possesses high-float properties normally found in medium-setting grades of emulsions. A method for preparation involves modifying the asphalt cement prior to emulsification, and then emulsifying with an emulsifier or agent normally used to manufacture rapid-setting emulsions such as ASTM D-977 RS-1 and RS-2 grades.--

At column 3, line 2, delete "trail" and insert therefor --trial--.

At column 10, line 28, delete "pounds" and insert therefor --ponents--.

Signed and Sealed this

Twenty-ninth Day of January 1985

[SEAL]

Attest:

DONALD J. QUIGG

Attesting Officer      Acting Commissioner of Patents and Trademarks